United States Patent

[11] 3,536,018

| [72] | Inventor | William C. Phelps<br>Chalmette, Louisiana |
|---|---|---|
| [21] | Appl. No. | 760,910 |
| [22] | Filed | Sept. 19, 1968 |
| [45] | Patented | Oct. 27, 1970 |
| [73] | Assignee | Woodamation, Inc.<br>Chalmette, Louisiana<br>a corporation of Louisiana |

[54] REFUSE BURNER
7 Claims, 2 Drawing Figs.

| [52] | U.S. Cl. | 110/18 |
|---|---|---|
| [51] | Int. Cl. | F23g 7/00 |
| [50] | Field of Search | 110/8, 18, 45, 28(F) |

[56] References Cited
UNITED STATES PATENTS

| 1,339,729 | 5/1920 | Walsh | 110/18 |
|---|---|---|---|
| 2,702,013 | 2/1955 | Atteberry | 110/45X |
| 2,804,031 | 8/1957 | Douglass | 110/18 |
| 3,137,253 | 6/1964 | Clayton | 110/18X |
| 3,289,620 | 12/1966 | Heilala | 110/45 |

*Primary Examiner*—Kenneth W. Sprague
*Attorney*—Wolf, Greenfield, and Sacks

ABSTRACT: A novel and improved refuse-burning furnace is provided to substantially completely burn refuse and unwanted products such as wood shavings, sawdust, cardboard and other combustible materials. A vertically extending furnace defines a generally circular cross section acting as a combustion chamber. A plurality of rows of air inlet means preferably comprising tubular vents are arranged at predetermined angles of less than 90° and extend between the chamber and a surrounding atmosphere. A top row of vents is located above the inlet means extending substantially radially of the furnace and an exhaust outlet is positioned above the tubular vents to cause material burned in the furnace to be rotated in levels from bottom to top and substantially completely consumed by fire in the furnace.

INVENTOR.
WILLIAM C. PHELPS

REFUSE BURNER

BACKGROUND OF THE INVENTION

The disposal of waste materials of a combustible nature has long been a problem. Often expensive burning means or sanitary land fill methods are used at high cost. Burning apparatus of an inexpensive type which provides for complete combustion without production of excessive soot and heavy black smoke is difficult to design. The problems become particularly involved at the site of large scale refuse production such as at sawmills where large amounts of sawdust are produced. In some cases, the mill owner must remove the sawdust from the site before burning because burning at the site would produce noxious odors and ash due to incomplete combustion.

It is an object of this invention to provide an uncomplicated burning furnace for providing substantially complete burning of materials. Another object of this invention is to provide a burning furnace in accordance with the preceding object which is inexpensive to construct, requires little maintenance and can be repeatedly used over a long lifetime to burn refuse materials.

SUMMARY OF THE INVENTION

According to the invention, a refuse-burning furnace comprises a vertically extending burner means defining a generally circular cross section and an interior combustion chamber. A plurality of rows of air inlet means comprise tubular vents arranged at predetermined angles of less than 90° extending between the chamber and a surrounding atmosphere. An upper row of vents is located above the inlet means with the upper vents being arranged radially with respect to the circular cross section of the combustion chamber. An exhaust outlet is positioned above the upper row of vents so that materials burned in the furnace are rotated by a swirling action in the furnace and substantially completely consumed by fire in said furnace during operation.

BRIEF DESCRIPTION OF THE DRAWINGS

The above and other features and objects of the present invention will be better understood from a reading of the following specification when read in conjunction with the accompanying drawings in which.

DESCRIPTION OF PREFERRED EMBODIMENTS

Figure 1:
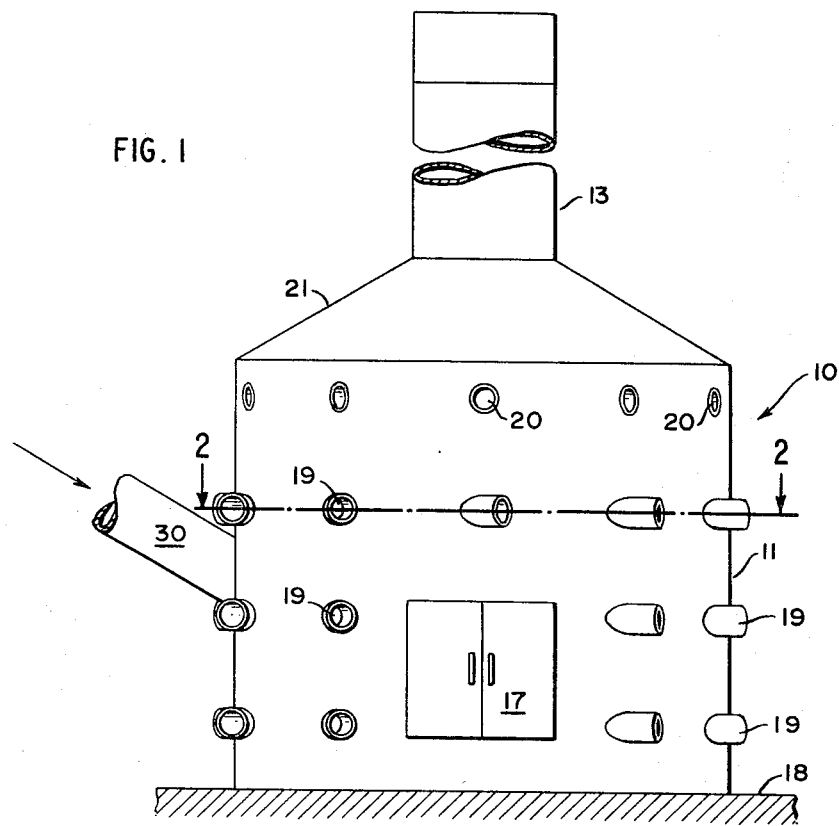
FIG. 1 is a front view of a preferred embodiment of a furnace in accordance with this invention.

With reference now to the drawing and more particularly FIG. 1, a refuse-burning furnace 10 is shown comprising a burning means 11 forming a combustion chamber 12 having an upper smokestack 13 forming an exhaust outlet.

The combustion chamber is preferably cylindrical as shown having a wall 14 which may be of metal such as iron with an inner lining of an insulating material 15 such as fire brick. The vertically extending cylindrical wall of the combustion chamber is symmetrical about a vertically extending central axis 16. In some cases, noncircular combustion chambers can be used although it is preferred to have a circular wall to increase swirling action within the chamber as will be described.

Preferably a pair of hinged doors 17 are provided which can be opened to admit the material to be burned such as sawdust and/or to remove the small amount of unburned wastes left after the burning action. Preferably the material to be burned is located in a central pile about the axis 16 covering the ground 18 on which the combustion chamber rests. During burning, additional waste materials to be burned can be continuously admitted through a chute (shown at 30) passing into the combustion chamber to provide for continuous burning rather than batch operation. The chute 30 is preferably closed by a damper (not shown) when materials are not being added.

The wall of the combustion chamber formed by the wall 14 and insulating fire brick is provided with at least two and preferably three horizontal rows of tubular vents 19. The tubular vents 19 are preferably identical to each other although their diameter and shape can vary. In the preferred embodiment, nine identical cylindrical stovepipe vents are used in the two lower rows with 10 identical vents in the upper row. These vents are spaced uniform distances apart about the perimeter of the chamber and each have a central axis 20 arranged at an angle X of less than 90° to a radius R extending in a horizontal plane from the center of the combustion chamber. Preferably angle X is 45° and the central axis of each vent lies in a plane perpendicular to vertical axis 16. Thus, the passageways formed by each tubular vent in the rows are inclined to the circle formed by the wall 14 and permit entrance of airflow in the direction of arrows 21 to create a swirling action as illustrated by arrow 22 at each level of each row. In the northern hemisphere, the vents are arranged as shown to provide for a clockwise motion of the burning gases due to coralis action. This action provides a centrifugelike action to burning particles causing them to swirl about in a clockwise direction and be completely exposed to the air entering from the tubular vents. As the gases and particles rise from the bottom row to the top row, they are constantly moved in the swirling clockwise action to provide for complete exposure to entering air carrying oxygen and therefore complete burning. In the southern hemisphere, the direction of the vents 19 is reversed to enhance counterclockwise motion due to coralis action.

A top row of tubular vents 20 is provided preferably comprising 10 vents evenly spaced about the perimeter of the burner means 11. The vents 20 are preferably arranged with their central axes coincident with radii R from the central axis 16 of the burner. The vents 20 supply air to reduce draft and to help inject cooler air directly into the top portion of the combustion chamber to lessen heat leaving through the stack 13 and the top of the burner.

Preferably a frustroconical metal section 21 forms a cover for the burner and mounts an outlet smokestack 13 as previously described.

Each vent 19 can be provided with a conventional damper or adjustable cover plate (not shown) at their outer ends for permitting complete opening of the passageway of each vent, partial opening or complete closing thereof to adjust the amount of environmental air admitted to the burner as desired.

In operation, a fire is started with refuse material positioned within the chamber, the dampers if used are opened and burning allowed to proceed. The rows or tiers of vents 19 provide for substantially complete burning since air is sucked in through these vents at high velocity and they act as jets to cause a circular motion at increased velocity. This causes the burning mass to circulate at a higher velocity in the plane of each row until material is burned whereupon it becomes lighter and rises to the next plane due to loss of weight and so on until all matter is completely burned and substantially only gases rise up through the stack carrying little or no ash as when sawdust is burned.

In a controlled experiment, a 50-gallon cylindrical oil drum having an axial length of 4 feet was used to form the combustion chamber and was provided with horizontal slots near the bottom for vents and a conical cap with a 6-inch smokestack. The drum was filled with newspaper and cardboard. Burning was started and during the entire burning cycle black smoke and unburned ash was emitted through the stack. Using another drum of the same size, but, with multiple 2-inch inside diameter pipes inserted at a 45° angle as shown in FIG. 1 and a top row of 2-inch diameter vents as shown in FIG. 1, a similar charge was burned. No visible smoke or ash was observed and high circular swirling action was observed in the burner during the entire cycle.

Figure 2:
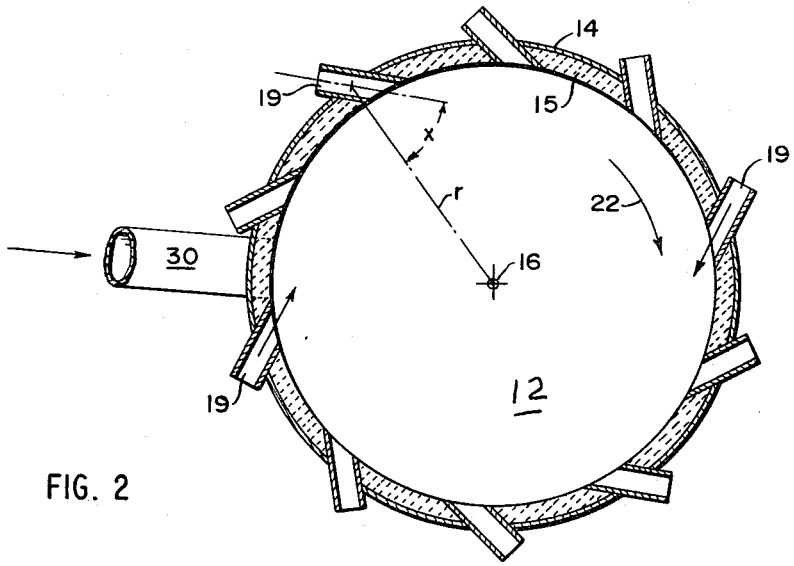
FIG. 2 is a cross-sectional view thereof taken through line 2-2 of FIG. 1.

In another example of this invention, the embodiment of FIGS. 1 and 2 is used. Chamber 12 has a diameter of 12 feet and a height of 15 feet. Ten 8-inch diameter openings 20 are evenly spaced about the circumference of the chamber as are the three rows of vents 19 (except at the door portion) which vents have a diameter of 8 inches. When a 39-lb. pile of wood, chips and sawdust 12 feet in diameter and 2 feet high is positioned in the chamber 12 and ignited, substantially complete burning is accomplished. It is estimated that each vent supplies 218 cubic feet of air per minute when angled as shown in FIG. 2. The inside chamber temperature during burning is about 1,000°F. with a static pressure of 0.1425 inches of water. In stack for draft.

While a specific embodiment of the present invention has been shown and described, it should be understood that many variations thereof are possible. For example, as previously mentioned, a sawdust or other waste material supply as shown in dotted outline at 30 in FIG. 1 can be provided to permit continuous burning of materials. While it is preferred that the combustion chamber be cylindrical, polygonal or other shapes may also be used in some cases. A frustroconical cover is preferred but may have other shapes as may the cylindrical stack 13. In all cases, multiple rows of angled inlet vent pipes are used to provide a high velocity circular motion of burning gases and waste products within the furnace. This feature is extremely important in the present invention and is basic. The exact number of vents and their size may vary depending upon the overall size of the combustion chamber and the amount of the charge to be burned although it is always preferred to space the vents uniformly both vertically and horizontally as shown in FIG. 1.

In view of the many modifications possible, this invention is to be limited only by the spirit and scope of the appended claims.

I claim:

1. A refuse-burning furnace comprising:
   a vertically extending burner means defining a generally circular cross section and an interior combustion chamber;
   a plurality of rows of air inlet means comprising tubular vents having central axes arranged at predetermined angles of less than 90° to radii extending from a central axis of said combustion chamber;
   said vents extending into said chamber and opening to the surrounding environmental atmosphere;
   a row of vents located above said inlet means with said last-mentioned vents being arranged radially of said circular cross section; and
   an exhaust outlet above said row of radially arranged vents whereby materials burned in said furnace are rotated in a swirling action and high velocity air flows through said inlet means to substantially completely consume said materials.

2. A refuse-burning furnace in accordance with claim 1 wherein said combustion chamber has an insulation lining.

3. A refuse-burning furnace in accordance with claim 1 wherein at least three horizontally extending rows of tubular vents are provided.

4. A refuse-burning furnace in accordance with claim 1 and further comprising an opening means for removal of waste and entrance of a charge.

5. A refuse-burning furnace in accordance with claim 1 and further comprising a conduit leading to an upper portion of said combustion chamber for charging materials to be burned to said furnace.

6. A refuse-burning furnace in accordance with claim 2 and further comprising said burner means having a cylindrical cross section with a frustroconical cover and an upwardly extending smokestack at the top of said furnace.

7. A refuse-burning furnace in accordance with claim 6 wherein three horizontally extending rows of inlet means are provided with a plurality of vents in each row being equally spaced about the perimeter of said combustion chamber, said tubular vents each being positioned with central axes thereof at a 45° angle to radii extending from a central axis of said combustion chamber.